United States Patent
Arsalan et al.

(10) Patent No.: US 10,337,293 B1
(45) Date of Patent: Jul. 2, 2019

(54) SYSTEMS, METHODS, AND APPARATUSES FOR DOWNHOLE LATERAL DETECTION USING ELECTROMAGNETIC SENSORS

(71) Applicant: Saudi Arabian Oil Company, Dhahran (SA)

(72) Inventors: Muhammad Arsalan, Dhahran (SA); Talha Jamal Ahmad, Dhahran (SA); Mohamed Nabil Noui-Mehidi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/382,812

(22) Filed: Apr. 12, 2019

Related U.S. Application Data

(63) Continuation of application No. 16/051,739, filed on Aug. 1, 2018, which is a continuation of application No. 15/188,414, filed on Jun. 21, 2016, now Pat. No. 10,061,049.

(60) Provisional application No. 62/183,004, filed on Jun. 22, 2015.

(51) Int. Cl.
E21B 41/00 (2006.01)
E21B 47/08 (2012.01)
E21B 47/12 (2012.01)
G01V 3/28 (2006.01)

(52) U.S. Cl.
CPC ........ *E21B 41/0035* (2013.01); *E21B 47/082* (2013.01); *E21B 47/122* (2013.01); *G01V 3/28* (2013.01)

(58) Field of Classification Search
None
See application file for complete search history.

(56) References Cited

U.S. PATENT DOCUMENTS

| | | | |
|---|---|---|---|
| 3,412,815 A | 11/1968 | Holser et al. | |
| 4,814,768 A | 3/1989 | Chang | |
| 5,467,083 A | 11/1995 | McDonald et al. | |
| 5,629,623 A | 5/1997 | Sezinger et al. | |
| 5,868,210 A | 2/1999 | Johnson et al. | |
| 6,496,138 B1 | 12/2002 | Honma | |
| 7,311,153 B2 | 12/2007 | McKee et al. | |
| 7,348,781 B2 | 3/2008 | Tabanou et al. | |

(Continued)

FOREIGN PATENT DOCUMENTS

| | | |
|---|---|---|
| EP | 2610434 A1 | 7/2013 |
| EP | 2740886 A1 | 6/2014 |
| WO | 2008118735 A1 | 10/2008 |
| WO | 2011051435 A2 | 5/2011 |
| WO | 2012085180 A2 | 6/2012 |

OTHER PUBLICATIONS

Haeni, F.P., et al.; "Detection and Mapping of Fractures and Cavities using Borehole Radar" Fractured Rock 2002 Denver, CO, Mar. 13-15, 2002; pp. 1-4.

(Continued)

*Primary Examiner* — Shane Bomar
(74) *Attorney, Agent, or Firm* — Bracewell LLP; Constance G. Rhebergen; Christopher L. Drymalla

(57) ABSTRACT

Disclosed are systems, methods, and apparatuses to detect one or more downhole laterals in a wellbore using electromagnetic sensors. Certain embodiments include a subsurface unit including a ruggedized encapsulation resistant to heat, pressure, and variations in pH. The systems and apparatuses are communicable with surface controls.

8 Claims, 9 Drawing Sheets

(56) References Cited

U.S. PATENT DOCUMENTS

| | | | |
|---|---|---|---|
| 8,692,555 B2 | 4/2014 | Kjerstad | |
| 9,476,285 B2 | 10/2016 | Zhou | |
| 10,145,233 B2 * | 12/2018 | Bittar | ........................ E21B 7/06 |
| 2002/0167418 A1 | 11/2002 | Goswami et al. | |
| 2005/0211469 A1 | 9/2005 | Kuckes et al. | |
| 2006/0042792 A1 | 3/2006 | Connell | |
| 2009/0084534 A1 | 4/2009 | Zupanick | |
| 2011/0175899 A1 | 7/2011 | Bittar et al. | |
| 2014/0202242 A1 | 7/2014 | Hallundbaek et al. | |
| 2015/0054454 A1 | 2/2015 | White et al. | |
| 2015/0115965 A1 | 4/2015 | Reiderman et al. | |
| 2015/0315850 A1 | 11/2015 | Hallundbaek et al. | |
| 2015/0346381 A1 | 12/2015 | Donderici | |
| 2016/0258284 A1 | 9/2016 | Bittar et al. | |

OTHER PUBLICATIONS

International Search Report and Written Opinion for related PCT application PCT/US2016/038511 dated Oct. 4, 2016; pp. 1-16.

Schweber, Bill; "AFE for auto radar provides signal path: 6-channel mux, PGA, LNA, filler, and 14-bit, 80-MapsADC" EE Times, May 25, 2011; pp. 1-3.

Wikipedia; "Electromagnetic absorption by water" available at the website: https://en.wikipedia.org/wiki/Electromagnetic_absorption_by_water as of Jun. 20, 2016; pp. 1-9.

Wikipedia; "Radar" available at the website https://en.wikipedia.org/wiki/radar as of Jun. 20, 2016; pp. 1-26.

\* cited by examiner

SYSTEMS, METHODS, AND APPARATUSES FOR DOWNHOLE LATERAL DETECTION USING ELECTROMAGNETIC SENSORS

RELATED APPLICATIONS

This application is a continuation of U.S. patent application Ser. No. 16/051,739 filed on Aug. 1, 2018 and titled "SYSTEMS, METHODS, AND APPARATUSES FOR DOWNHOLE LATERAL DETECTION USING ELECTROMAGNETIC SENSORS", which is a continuation of U.S. patent application Ser. No. 15/188,414 filed on Jun. 21, 2016 and titled "SYSTEMS, METHODS, AND APPARATUSES FOR DOWNHOLE LATERAL DETECTION USING ELECTROMAGNETIC SENSORS", which claims the benefit of U.S. Provisional Patent Application No. 62/183,004 filed on Jun. 22, 2015 and titled "SYSTEMS, METHODS, AND APPARATUSES FOR DOWNHOLE LATERAL DETECTION USING ELECTROMAGNETIC SENSORS", which are hereby incorporated by reference in their entireties.

FIELD OF INVENTION

Embodiments relate to oil and gas exploration and, more particularly, to downhole tools.

BACKGROUND OF THE INVENTION

In recent years, it has become possible to drill and maintain increasingly complicated wellbores. In some cases, rather than drilling multiple vertical wells, it may be advantageous to drill relatively fewer vertical wells, but branch out from these vertical wells with a greater number of lateral wells. Hence, a primary wellbore with laterals branching out from it can provide the coverage desired of a downhole formation at less expense and time than would be needed to achieve the same coverage with multiple vertical wells. The savings in time and money, however, are accompanied by new challenges. Indeed, as the number of laterals branching from a primary wellbore increases, so too does the difficulty of locating and entering specific laterals.

One proposed solution involves the installation of special fixtures in the casing. The fixtures may be installed at the connection point between a lateral and the primary wellbore, thereby to allow for the landing of an intervention tool at the connection point. Another proposed technique involves a specialized downhole contraption, which includes an indexing tool, a kickover knuckle joint attached at the lower end of the indexing tool, and a wand attached at the lower end of the kickover knuckle joint. The contraption may be lowered into a primary wellbore at the end of coiled tubing. A user may tag the bottom of the primary wellbore in order to establish a maximum depth. Then, the contraption may be raised to the estimated location of a connection between a lateral wellbore and the primary wellbore. At that point, the kickover knuckle joint may be used to deflect the wand away from the longitudinal axis of the downhole contraption, and the contraption may be raised or lowered in the primary wellbore. To orient the contraption in the primary wellbore, the indexing tool may be used to rotate the wand relative to the coiled tubing. If a lateral is located, the tip of the wand may be fully bent into the lateral. When the wand is fully bent, pressurizing fluid in the downhole contraption may be vented, which can provide a surface indication to the user that a lateral wellbore has been located.

SUMMARY OF THE INVENTION

Applicant has recognized a number of problems in current approaches to detect laterals. For example, Applicant has recognized that the kickover and wand technique suffers from a number of shortcomings. First, this technique is prone to error as an operator can fail to locate a lateral simply because an inappropriate wand length was chosen. In addition, Applicant has recognized that these downhole contraptions do not include means for accurate downhole depth control and yet rely heavily on such depth control to detect laterals. Hence, Applicant has recognized that this method can be highly inaccurate. In addition, the kickover and wand technique is expensive, and the added cost provides little in the way of added benefit.

Furthermore, the technique involving installation of special fixtures in a casing requires, of course, a casing. If primary casing has been installed, but is not yet cemented in place, these fixtures cannot be installed. Moreover, there can be situations in which the primary casing has not been installed at all. For example, an operator might want to access a lateral directly from an open-hole, or uncased, wellbore. In these situations, Applicant has recognized that the special fixture technique cannot be used. Hence, this technique can be used only at certain stages of development, and then only at great cost. Applicant has recognized that these costs negate some of the synergies provided by multilateral wells in the first place. Moreover, Applicant has recognized the need for systems, methods, and apparatuses to detect laterals at all stages of development of a multilateral well in a cost-effective matter.

Having recognized these and other problems, Applicant proposes systems, methods, and apparatuses for enhanced and economical detection of laterals. Embodiments can include a subsurface unit, a surface unit, and a wireline or coil tubing operably connecting the two. At times in this application, the subsurface unit is referred to as a lateral detection tool. It will be understood that the subsurface unit or lateral detection tool, as with other components discussed in this application, can be made and used independently of other components, and such manufacture and use is within the scope of the invention. Moreover, it will be understood by one skilled in the art that the steps performed by each of the components discussed in this application, including combinations of steps and sub-combinations, can form the steps of one or more methods to detect laterals according to embodiments.

In embodiments, the subsurface unit includes a ruggedized encapsulation. The subsurface unit can be introduced into a motherbore through a motherbore surface entry and have an uphole end and a downhole end relative to the motherbore surface entry. According to embodiments, the ruggedized encapsulation can be high-temperature resistant, high-pressure resistant, and acid resistant.

In embodiments, the subsurface unit includes a control and communication subsystem disposed within the uphole end of the subsurface unit. The control and communication subsystem can include a controller adapted to control operations of the subsurface unit and a signal generator adapted to generate a wideband electromagnetic signal. The control and communication subsystem further can include a modulator responsive to the controller and the signal generator and adapted to modulate the wideband electromagnetic signal in order to generate a modulated signal. In addition, the control and communication subsystem can include a transmitter responsive to the controller and the modulator and adapted to transmit the modulated signal to an antenna via a duplexer. The duplexer can be responsive to the controller and the transmitter and adapted to allow for a bidirectional signal path. The control and communication subsystem further can include a receiver responsive to the controller and the duplexer and adapted to detect reflections of an electromagnetic pulse conveyed to the receiver from one or more antennas via the duplexer. The reflections of the electromagnetic pulse characterize a received signal. In embodiments, the control and communication subsystem can include a demodulator responsive to the controller and adapted to demodulate the received signal, thereby to generate a demodulated signal. Moreover, the control and communication subsystem can include a communication module adapted to receive the demodulated signal and communicate the demodulated signal to the surface unit as will be discussed more thoroughly in a succeeding paragraph.

According to embodiments, the subsurface unit also can include a tool head disposed within the downhole end of the subsurface unit. The tool head can include one or more wideband antennas. "Antenna," as used in this application, can refer to one or multiple electromagnetic antennas. The term also can refer to a plurality of electromagnetic antennas arranged in an antenna array. For example, it is within the scope of the term "antenna," and within the scope of the invention, to include one or more transmitting antennas and one or more receiving antennas in an antenna array. For brevity and clarity, Applicant uses the term "antenna" to refer to these and other embodiments. For example, it is within the scope of the invention to employ an antenna that includes a single antenna, multiple antennas, or an antenna array. Antennas in an array can take many configurations, including phased arrays, dipole arrays, and other configurations that will be apparent to one of skill in the art upon reading this disclosure. The one or more wideband antennas can be responsive to the duplexer and the transmitter and adapted to convert the modulated signal transmitted by the transmitter via the duplexer into an electromagnetic pulse. The one or more antennas further can be adapted to radiate the electromagnetic pulse through a downhole environment. In addition, the one or more wideband antennas can be adapted to detect reflections of the electromagnetic pulse and convey the reflections of the electromagnetic pulse to the receiver via the duplexer.

Embodiments can include a wireline or coiled tubing adapted to allow for data and power transfer. According to embodiments, the surface unit can include one or more processors adapted to receive data from the communication module via the wireline. The surface unit further can include one or more displays in communication with the one or more processors and tangible computer-readable medium in communication with the one or more processors. The tangible computer-readable medium can have stored internally a plurality of operational modules, including a signal processing module adapted to process the demodulated signal thereby to detect the presence and location of laterals and sidetracks in the downhole environment. According to embodiments, the one or more displays can be adapted to display the presence and location of laterals and sidetracks in the downhole environment.

In some embodiments, provided is a system for detecting lateral well bores that includes a subsurface unit adapted to be disposed in a motherbore of a well The subsurface unit including a controller, a receiver, and a wideband antenna. The wideband signal generator adapted to generate electromagnetic signals of frequencies within a wideband frequency range. The controller adapted to identify a first frequency within the wideband frequency range, and control the wideband signal generator to cause the wideband signal generator to generate a first electromagnetic signal of the first frequency. The receiver adapted to receive signals corresponding to reflections resulting from radiation of electromagnetic pulses into an environment surrounding the subsurface unit. The wideband antenna adapted to generate electromagnetic pulses having frequencies within the wideband frequency range. The wideband antenna further adapted to receive a first signal corresponding to the first electromagnetic signal of the first frequency, radiate, into a first environment surrounding the subsurface unit, a first electromagnetic pulse (of the first frequency) corresponding to the first signal corresponding to the first electromagnetic signal, and to detect one or more first reflections resulting from the radiation of the first electromagnetic pulse into the first environment surrounding the subsurface unit. The antenna further adapted to provide one or more first reflection signals corresponding to the one or more first reflections to the receiver. The receiver being adapted to provide the one or more first data signals corresponding to the one or more first reflection signals to a processing module. The processing module being adapted to determine whether a lateral is present in the first environment based at least in part on the one or more first data signals corresponding to the one or more first reflection signals.

In certain embodiments, the controller is further adapted to identify a second frequency within the wideband frequency range, and control the wideband signal generator to cause the wideband signal generator to generate a second electromagnetic signal of the second frequency. The wideband antenna being further adapted to receive a second signal corresponding to the second electromagnetic signal of the second frequency, radiate, into a second environment surrounding the subsurface unit, a second electromagnetic pulse (of the second frequency) corresponding to the second signal corresponding to the second electromagnetic signal, and detect one or more second reflections resulting from the radiation of the second electromagnetic pulse into the second environment surrounding the subsurface unit. The antenna further adapted to provide, to the receiver, one or more second reflection signals corresponding to the one or more second reflections. The receiver being adapted to provide one or more second data signals corresponding to the one or more second reflection signals to the processing module. The processing module being adapted to determine whether a lateral is present in the second environment based at least in part on the one or more second data signals corresponding to the one or more second reflection signals.

In some embodiments, the first environment is a first portion of a motherbore of a first well, and the second environment is a second portion of the motherbore of the first well. In some embodiments, the first environment is a portion of a motherbore of a first well, and the second environment is a portion of a motherbore of a second well.

In certain embodiments, the system includes the processing module adapted to determine that a lateral is present in the first environment in response to determining that the one or more first reflections are relatively weak, and to determine that a lateral is not present in the first environment in response to determining that the one or more first reflections are relatively strong.

In some embodiments, the subsurface unit further includes: a modulator adapted to modulate the first electromagnetic signal of the first frequency to generate a first modulated signal, a transmitter adapted to transmit the first modulated signal to the duplexer, and the duplexer adapted to receive the first modulated signal from the transmitter and transmit the first modulated signal to the wideband antenna. The receiving, by the wideband antenna, of the first signal corresponding to the first electromagnetic signal of the first frequency comprising receiving the first modulated signal form the duplexer. In certain embodiments, the duplexer is adapted to receive, from the wideband antenna, one or more first antenna signals corresponding to the one or more first reflections resulting from the radiation of the first electromagnetic pulse into the first environment surrounding the subsurface unit and to transmit the one or more first antenna signals to the receiver, the receiver is adapted to receive the one or more first antenna signals from the duplexer and to transmit the one or more first antenna signals to the demodulator, and the subsurface unit further includes the demodulator adapted to demodulate the one or more first antenna signals received from the receiver to generate one or more first demodulated antenna signals and to transmit the one or more first demodulated antenna signals to the processing module, the one or more first data signals provided to the processing module corresponding to the one or more first demodulated antenna signals.

In some embodiments, the system further includes a surface unit including the processing module, and the subsurface unit further is adapted to determine whether a connection between the communication module and the surface unit is available, and communicate, in response to determining that a connection between the communication module and the surface unit is available, the one or more first data signals to the processing module of the surface unit.

In certain embodiments, the system further includes a surface unit and the subsurface unit further includes the processing module. The processing module adapted to generate lateral data indicative of whether a lateral is present in the first environment based at least in part on the one or more first data signals corresponding to the one or more first reflection signals. The subsurface unit further adapted to determine whether a connection between the communication module and the surface unit is available, and communicate, in response to determining that a connection between the communication module and the surface unit is available, the lateral data to the surface unit.

In some embodiments, the wideband frequency range has a bandwidth of about 5 gigahertz (GHz). In some embodiments, the wideband frequency range has a range of about 1 kilohertz (KHz) to about 5 GHz. In certain embodiments, the controller is further adapted to identify a first transmission power for the first electromagnetic signal, and control the wideband signal generator to cause the wideband signal generator to generate the first electromagnetic signal of the first frequency and the first transmission power. In certain embodiments, the first transmission power is determined based on one or more of the following characteristics of the first environment: type of formation, prior resistivity log, or wellbore hole (or opening) diameter.

In some embodiments, a method is provided that includes identifying a first frequency within a wideband frequency range of a wideband signal generator and a wideband antenna of a subsurface unit (the first frequency being determined based on characteristics of a first motherbore environment). The method includes, when the unit is disposed in the first motherbore environment: generating, by the wideband signal generator, a first electromagnetic signal of the first frequency; radiating, by the wideband antenna of the subsurface unit, a first electromagnetic pulse corresponding to the first electromagnetic signal (the first electromagnetic pulse being of the first frequency); and detecting, by the wideband antenna of the subsurface unit, one or more first reflections resulting from the radiation of the first electromagnetic pulse. A determination of whether a lateral is present in the first motherbore environment being based at least in part on the one or more first reflections detected. The method also including identifying a second frequency within the wideband frequency range of the wideband signal generator and the wideband antenna of the subsurface unit (the second frequency being determined based on characteristics of a second motherbore environment). The method includes, when the unit is disposed in the second motherbore environment: generating, by the wideband signal generator, a second electromagnetic signal of the second frequency; radiating, by the wideband antenna of the subsurface unit, a second electromagnetic pulse corresponding to the second electromagnetic signal (the second electromagnetic pulse being of the second frequency); and detecting, by the wideband antenna of the subsurface unit, one or more second reflections resulting from the radiation of the first electromagnetic pulse. A determination of whether a lateral is present in the second environment being based at least in part on the one or more second reflections detected.

In some embodiments, the first motherbore environment is a first portion of a motherbore of a first well, and the second motherbore environment is a second portion of the motherbore of the first well. In some embodiments, the first motherbore environment is a portion of a motherbore of a first well, and the second motherbore environment is a portion of a motherbore of a second well.

BRIEF DESCRIPTION OF THE DRAWINGS

These and other features, aspects, and advantages of the present invention will become better understood with regard to the following descriptions, claims, and accompanying drawings in which like numbers represent like components. It is to be noted, however, that the drawings illustrate only several embodiments and are not to be considered limiting of the invention's scope as the invention comprises other effective embodiments.

DETAILED DESCRIPTION

So that the manner in which the features and advantages of the embodiments of systems, methods, and apparatuses of the present invention, as well as others, which will become apparent, may be understood in more detail, a more particular description of the embodiments briefly summarized in the preceding section may be had by reference to the embodiments thereof, which are illustrated in the appended drawings, which form a part of this specification. It is to be noted, however, that the drawings illustrate only various embodiments of the embodiments and, therefore, are not to be considered limiting of the embodiments of the present invention's scope as the invention includes other effective embodiments as well.

Figure 1:
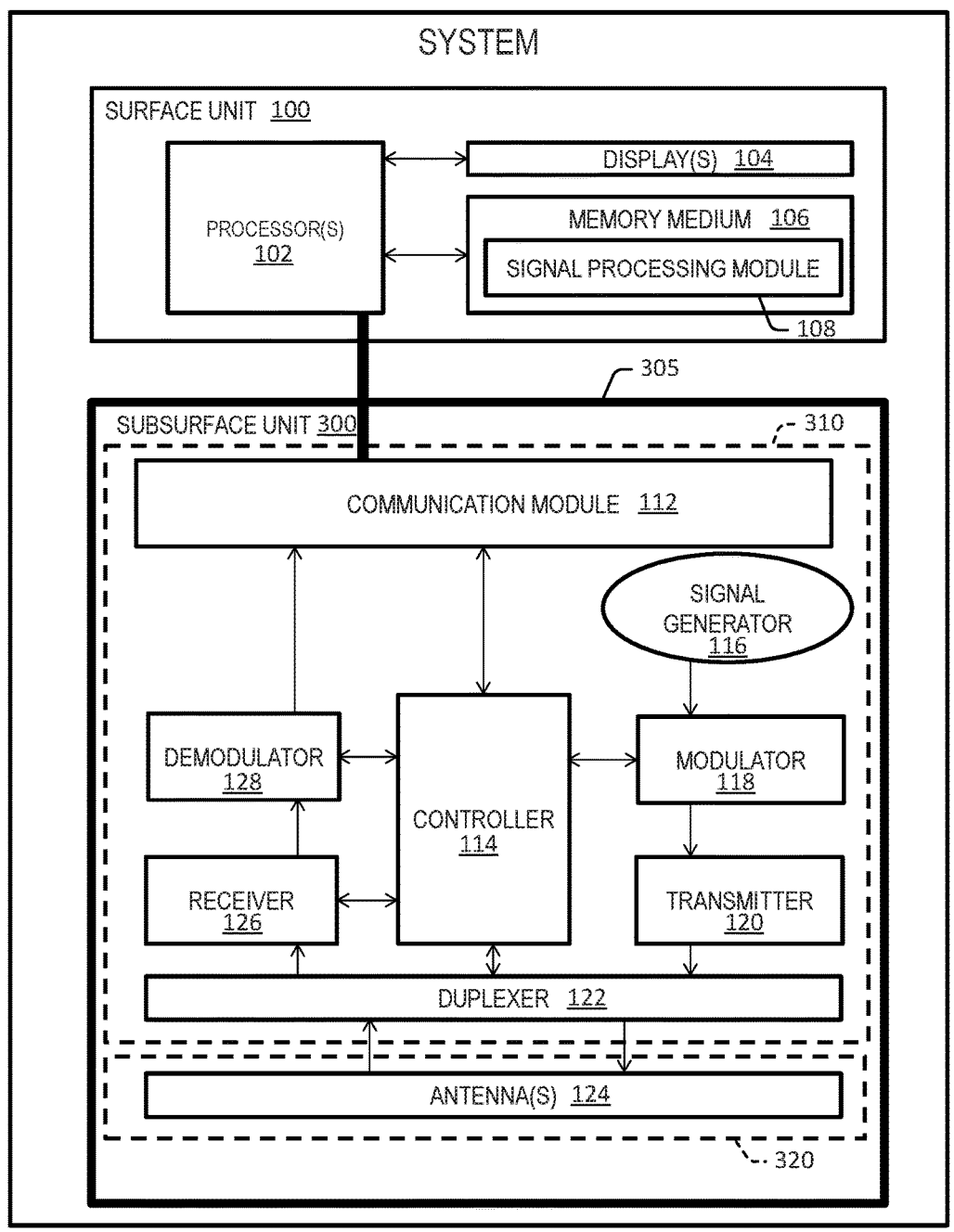
FIG. 1 is a schematic diagram of a system that depicts a surface unit with a signal processing module disposed internally, a subsurface unit, and a wireline operably connecting the two, according to an embodiment.
Figure 2:
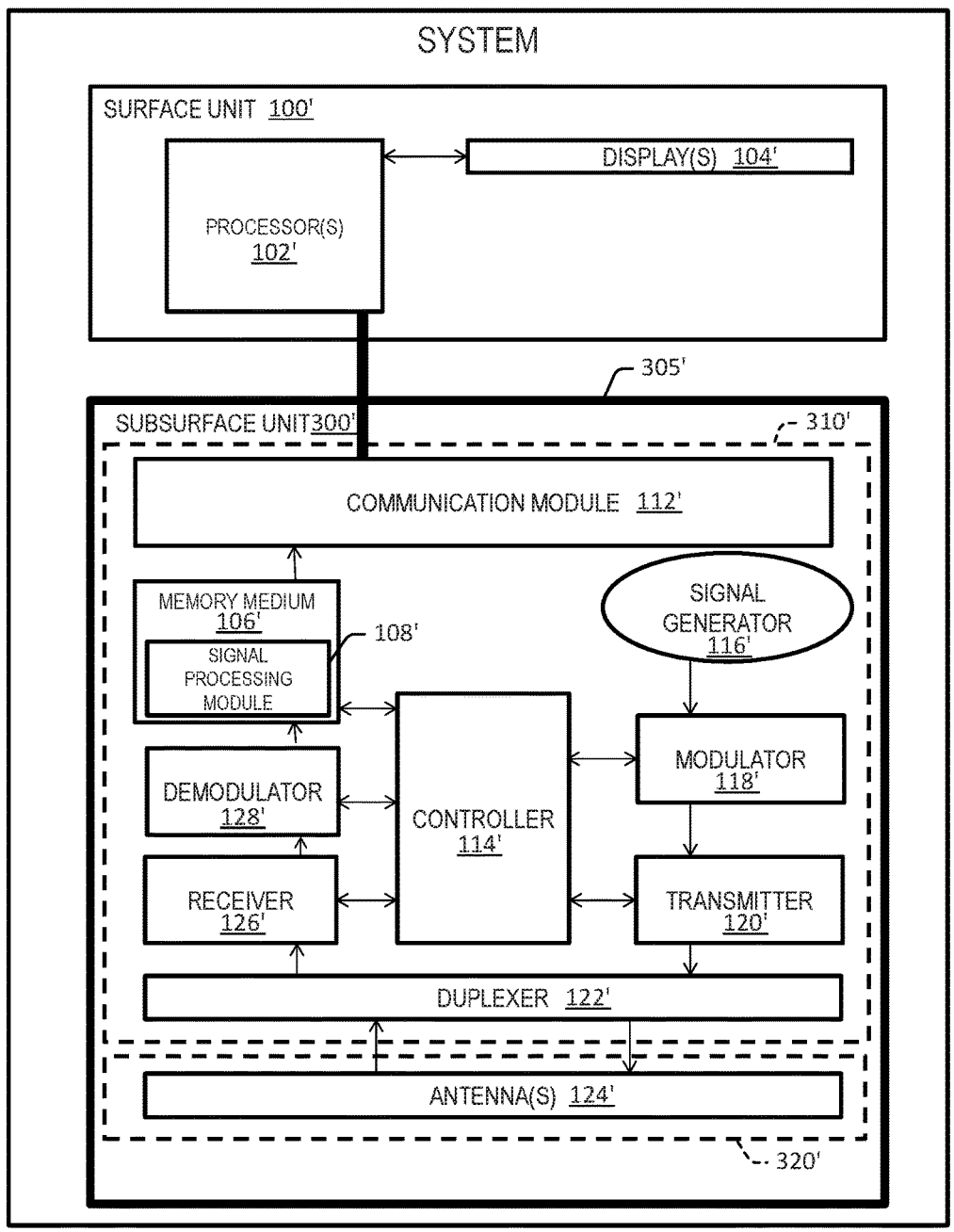
FIG. 2 is a schematic diagram of a system that depicts a surface unit, a subsurface unit with a signal processing module disposed internally, and a wireline operably connecting the two, according to an embodiment.

FIGS. 1 and 2 depict system embodiments. To provide a clearer disclosure, these figures are discussed together for the most part, with differences being highlighted. System embodiments can include a subsurface unit 300, 300', a surface unit 100, 100', and a wireline 110, 110' or coil tubing (not pictured) operably connecting the subsurface unit 300, 300' and the surface unit 100, 100'. In embodiments, the subsurface unit 300, 300' includes a ruggedized encapsulation 305, 305'. The ruggedized encapsulation 305, 305' protects components of the subsurface unit 300, 300' from elements in the downhole environment, but permits the transmission of electromagnetic signals. In embodiments, the ruggedized encapsulation 305, 305' is constructed using a non-ferromagnetic downhole material that can be machined or printed. For example, in embodiments the ruggedized encapsulation 305, 305' can be constructed partially or wholly with polyether ether ketone (PEEK).

In embodiments, the subsurface unit 300, 300' includes a control and communication subsystem 310, 310' disposed within the uphole end of the subsurface unit 300, 300'. Uphole and downhole, as used in this application, refer to components' relative distance to a motherbore surface entry when the subsurface unit 300, 300' is introduced into a motherbore. More detail will be provided with reference to FIGS. 4A-C. To orient the reader, however, it is noted that uphole components relative to the motherbore surface entry can be thought of as elevationally above downhole components relative to the motherbore surface entry when the subsurface unit 300, 300' is oriented vertically in the motherbore. For example, the downhole end of the subsurface unit 300 may refer to a front/head portion of the subsurface unit 300 that enters and travels through the motherbore ahead of the uphole end of the subsurface unit 300. The uphole end of the subsurface unit 300 may refer to a rear/tail portion of the subsurface unit 300 that enters and travels through the motherbore behind the downhole end of the subsurface unit 300.

The control and communication subsystem 310, 310' can include a controller 114, 114' configured to control operations of the subsurface unit 300, 300' and a signal generator 116, 116' configured to generate an electromagnetic signal. According to embodiments, the electromagnetic (EM) signal is of a frequency that falls within the frequency range of a wideband signal source used to generate the signal, such as a wideband signal generator and the wideband antenna ultimately used to transmit the signal. In some embodiments, a signal source may emit wideband frequencies. In such an embodiment, a narrower frequency of interest (within the wideband frequency) may be analyzed based on the reflections received at the receiver. The control and communication subsystem 310, 310' further can include a modulator 118, 118' responsive to (e.g., controlled by) the controller 114, 114' and the signal generator 116, 116' and configured to modulate the electromagnetic signal, thereby to generate a modulated signal. In addition, the control and communication subsystem 310, 310' can include a transmitter 120, 120' responsive to the controller 114, 114' and the modulator 118, 118' and configured to transmit the modulated signal to an antenna 124, 124' via a duplexer 122, 122'. By using a wideband signal generator 116, 1116' and a wideband antenna (e.g., including multiple antennas, such as a wideband antenna array) 124, 124', a wide bandwidth can be achieved, which, in turn, can be used to facilitate a wide range of signal frequencies. This ensures the proper frequencies for a given environmental condition can be achieved. For example, a signal frequency that is appropriate for the environmental conditions in which the subsurface unit 300, 300' is located in can be selected from the wide range of frequencies available with the signal generator 116, 116' (e.g., a wideband signal generator) and the antenna 124, 124' (e.g., a wideband antenna arrangement), and a signal of the selected frequency can be generated and transmitted as described herein. Moreover, an antenna array 124, 124' can offer precise control over various pulse parameters, including the size, power, polarization, and beam angle of the radiated pulse. Similar to the signal frequency, this can further ensure proper pulse parameters for a given environmental condition can be achieved. The wideband signal generator 116, 116' may have a maximum operational frequency of about 5 GHz, and/or a minimum operational frequency of about 1 KHz. The wideband signal generator 116, 116' may have a bandwidth of about 5 GHz. For example, the wideband signal generator 116, 116' can have an operational frequency range of about 1 KHz to about 5 GHz. That is, the wideband signal generator 116, 116' may be operable to generate an electromagnetic signal having a frequency in the range of about 1 KHz to about 5 GHz. The wideband antenna 124, 124' may have a maximum operational frequency of about 5 GHz, and/or a minimum operational frequency of about 1 KHz. The wideband antenna 124, 124' may have a bandwidth of about 5 GHz. For example, the wideband antenna 124, 124' can have an operational frequency range of about 1 KHz to about 5 GHz. That is, the wideband antenna (or antenna array) 124, 124' may be operable to transmit an electromagnetic signal having a frequency in the range of about 1 KHz to about 5 GHz. The signal generator 116, 116' and antenna 124, 124' described may include a wideband signal generator and wideband antenna although sometime referred to simply as a signal generator and an antenna, respectively. The wideband antenna 124, 124' can be a single antenna, such as fractal antenna, or a an array of antennas covering the complete bandwidth (e.g., about 1 KHz to about 5 GHz).

The duplexer 122, 122' can be responsive to the controller 114, 114' and the transmitter 120, 120' and configured to allow for a bidirectional signal path. In other words, the duplexer 122, 122' can allow a signal from the transmitter 120, 120' to be radiated by the antenna 124, 124' and further can allow reflected signals detected by the antenna 124, 124' to be detected by the receiver 126, 126'. The receiver 126, 126', which also can be included within the control and communication subsystem 310, 310', can be responsive to the controller 114, 114' and the duplexer 122, 122' and configured to detect reflections of an electromagnetic pulse combined and transmitted to the receiver 126, 126' from one or more antennas 124 via the duplexer 122, 122'. The reflections of the electromagnetic pulse characterize a received signal. In embodiments, the control and communication subsystem 310, 310' can include a demodulator 128, 128' responsive to the controller 114, 114' and configured to demodulate the received signal, thereby to generate a demodulated signal. Moreover, the control and communication subsystem 310, 310' can include a communication module 112, 112' configured to receive the demodulated signal and communicate the demodulated signal to the surface unit 100, 100' as discussed herein.

According to embodiments, the subsurface unit 300, 300' also can include a tool head 320, 320' disposed within the downhole end of the subsurface unit 305, 305'. The one or more antennas 124, 124' previously noted can be disposed within the tool head 320, 320'. In this manner, reusable, costly components, including circuitry, are included in the control and communication subsystem 310, 310', while the one or more wideband antennas 124, 124' are segregated into the tool head 320, 320'. Thus, in embodiments the tool head 320, 320' can be sacrificed inside the lateral, and the control and communication subsystem 310, 310' can be recovered. For example, the tool head 320, 320' may be a module that is detachable from the communication subsystem 310, 310', and during operation, the tool head 320, 320' may be physically separated from the communication subsystem 310, 310' such that it remains in the lateral or wellbore, and the communication subsystem 310, 310' is retrievable without the tool head 320, 320'. This may be advantageous, for example, if the tool head 320, 320' becomes lodged in the lateral or wellbore such that it is not immediately retrievable, and the communication subsystem 310, 310' can be retrieved from the lateral or wellbore via detachments from the tool head 320, 320'. It is within the scope of the invention to employ a single antenna, multiple antennas, or an antenna array in the tool head 320, 320'. The one or more wideband antennas 124, 124' can be responsive to the duplexer 122, 122' and the transmitter 120, 120' and be configured to convert the modulated signal transmitted by the transmitter 120, 120' via the duplexer into an electromagnetic pulse. The one or more wideband antennas 124, 124' further can be configured to radiate the electromagnetic pulse through a downhole environment. In addition, the one or more wideband antennas 124, 124' can be configured to detect reflections of the electromagnetic pulse and combine and transmit signals corresponding to the reflections of the electromagnetic pulse to the receiver 126, 126' via the duplexer 122, 122'.

Embodiments can include a wireline 110, 110' or coiled tubing configured to allow for data and power transfer. For example, settings of the controller 114, 114' can be adjusted via the wireline 110, 110'. In addition, data transferred via the wireline 110, 110' can be used to convey data regarding the operational status of various components of the subsurface unit 300, 300'. It will be understood by one skilled in the art that various other power and data channels can be used in place of the wireline 110, 110' while staying within the scope of the invention. For example, according to embodiments, the subsurface unit 300, 300' is powered by an internally-disposed battery. Meanwhile, data can be transferred between the subsurface unit 300, 300' and the surface unit 100, 100' via a cable optimized for data transfer or, in embodiments, wirelessly.

According to embodiments, the surface unit 100, 100' can include one or more processors 102, 102' configured to receive data from the communication module 112, 112' via the wireline 110, 110'. The surface unit 100, 100' further can include one or more displays 104, 104' in communication with the one or more processors 102, 102'.

In embodiments, the surface unit 100 includes tangible computer-readable medium 106 in communication with the one or more processors 102. The tangible computer-readable 106 medium can have stored internally a plurality of operational modules, including a signal processing module 108 configured to process the demodulated signal thereby to detect the presence and location of laterals and sidetracks in the downhole environment. Such a configuration can resemble the configuration illustrated schematically in FIG. 1. In other embodiments, including, for example, that shown in FIG. 2, tangible computer-readable medium 106' and embedded signal processing module 108' can be included in subsurface unit 300'. Hence, for example, if a reliable high speed data link is not available, signal processing module 108' can process the demodulated signal locally in the subsurface unit 300'. The processed demodulated signal then can be transmitted to the communication module 112', where data embodying the processed signal will remain until a reliable data channel allows communication of the processed signal to the surface unit 100'. The communication module 112, 112' can include modules operable to both receive and transmit data, including, for example, transmitter-receivers and transceivers. One or more additional communication modules, not pictured, can be used to relay power or data to the subsurface unit 300, 300' or to relay data from the subsurface unit 300, 300' to the surface unit 100, 100', for use by the one or more processors 102, 102'. Various digital and analog communication protocols known to those skilled in the art can be used to manage communication between units. According to embodiments, the one or more displays 104, 104' can be configured to display the presence and location of laterals and sidetracks in the downhole environment.

Figure 3:
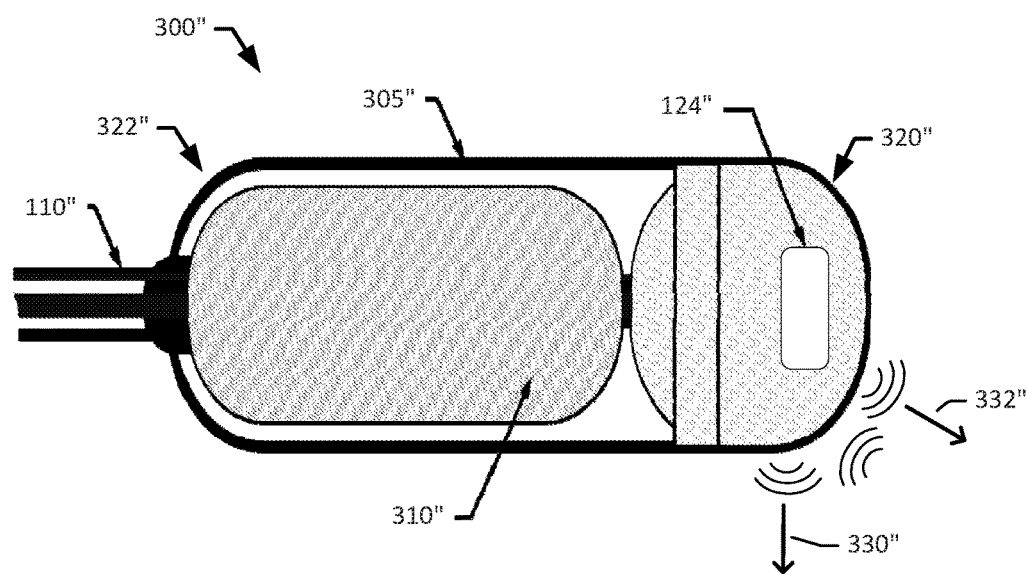
FIG. 3 is a schematic diagram of a subsurface unit according to an embodiment.

One possible configuration of the components discussed in this application is shown in FIG. 3. The subsurface unit 300", otherwise known as a lateral detection tool 300", is depicted oriented horizontally with the tool head 320" (e.g., a downhole/front/head portion of the subsurface unit 300" depicted on the right side of FIG. 3). The tool head 320" may refer to a downhole/front/head portion of the subsurface unit 300" that enters and travels through the motherbore ahead of a tool tail 322" of the subsurface unit 300" (e.g., an uphole/rear/tail portion of the subsurface unit 300" depicted on the left side of FIG. 3). Thus, the tool tail 322" may refer to a portion of the subsurface unit 300" that enters and travels through the motherbore behind the tool head 320" of the subsurface unit 300". In operation, the tool head 320" can be the leading/lowest portion of the lateral detection tool 300", though this does not have to be the case, as in, for example, when the lateral detection tool 300" enters a detected lateral. That is, when the lateral detection tool 300" is introduced into a motherbore by the wireline 110" or coil tubing, the lateral detection tool 300" can have a substantially vertical profile with the tool head 320" elevationally below the control and communication subsystem 310". As noted, the wireline 110" or coil tubing can allow for power and bi-directional communication for commands, controls, and data transfer. The control and communication subsystem 310" can include a signal processing module, for example, according to the internal configuration shown in FIG. 2. In embodiments, the signal processing module can be located elsewhere, for example, according to the configuration shown in FIG. 1. In either case, the lateral detection tool 300" includes a ruggedized encapsulation 305". According to embodiments, the ruggedized encapsulation 305" can be high-temperature resistant, high-pressure resistant, and acid resistant. The ruggedized encapsulation 305" can be constructed non-uniformly in some embodiments. For example, conductive alloys (e.g., EM conductive alloys or polymers) can be built into the ruggedized encapsulation at the tool head 320" to aid the one or more antennas in both radiating an electromagnetic pulse and detecting reflections of the electromagnetic pulse. Certain configurations may be favored if the lateral detection tool 300″ communicates wirelessly with a surface unit. For example, additional metals (e.g., carbon fiber with PEEK) can be included in the ruggedized encapsulation 305″ to ensure enhanced reception of wireless signals. In some embodiments, the antenna 124 may be oriented to direct the generated signal laterally (e.g., at least partially in a direction ahead of the lateral detection tool 300″, such as in the direction of arrow 330″, such that the signal encounters lateral portions of the motherbore adjacent the tool 300″) and/or longitudinally (e.g., at least partially in a direction ahead of the lateral detection tool 300″, such as in the direction of arrow 332″) such that the signal encounters downhole portions of the motherbore ahead of the tool 300″. Such a longitudinal signal can, for example, enable the detection of a lateral before the lateral detection tool 300″ is adjacent the lateral. For example, if an upper wall of a lateral intersects a motherbore at a depth of about 1000 meters in the motherbore, the lateral may be detected when the tool head 320″ of the detection tool 300″ is located at a depth of about 999 meters in the motherbore.

According to embodiments, the subsurface unit 400, 400′, 400″ can be introduced into a motherbore 450, 450′, 450″ through a motherbore surface entry 405, 405′, 405″ and have an uphole end and a downhole end relative to the motherbore surface entry 405, 405′, 405″. Subsurface units 400, 400′, 400″ oriented as such and in operation are shown, for example, in FIGS. 4A-C, though it will be understood by one skilled in the art that other orientations are possible. For example, a subsurface unit 400, 400′, 400″ can be disposed within a lateral after such a lateral is detected. It will be understood in that event that the subsurface unit 400, 400′, 400″ will have a non-vertical absolute profile, but it still will have an uphole/downhole perspective with respect to a device axis that is substantially parallel with the axis of the wellbore in which the device is positioned. Indeed, if the subsurface unit 400, 400′, 400″ enters a sidetrack, the subsurface unit 400, 400′, 400″ can be oriented horizontally. Hence, it will be understood that portions of the of the subsurface unit 400, 400′, 400″ referred to as uphole and those referred to as downhole can, at times, have a substantially similar absolute distance to the motherbore surface entry 405, 405′, 405″. In other words, uphole and downhole are not used in an absolute elevation sense. Rather these terms orient the reader as to the relative positions of components in the subsurface unit 400, 400′, 400″ with respect to the motherbore surface entry.

Figure 4A:
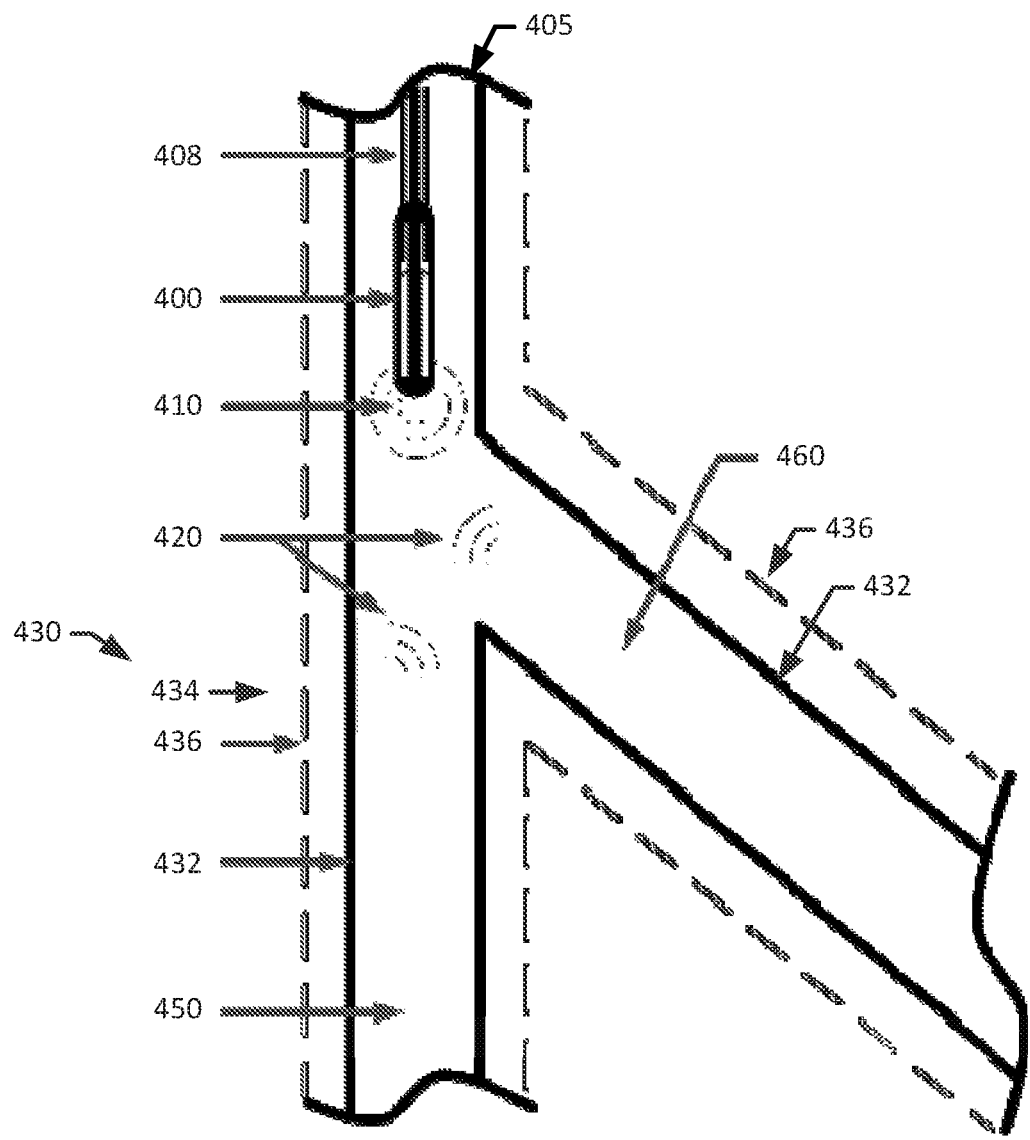
FIGS. 4A-C are schematic diagrams of subsurface units introduced into various downhole environments according to embodiments.
Figure 4B:
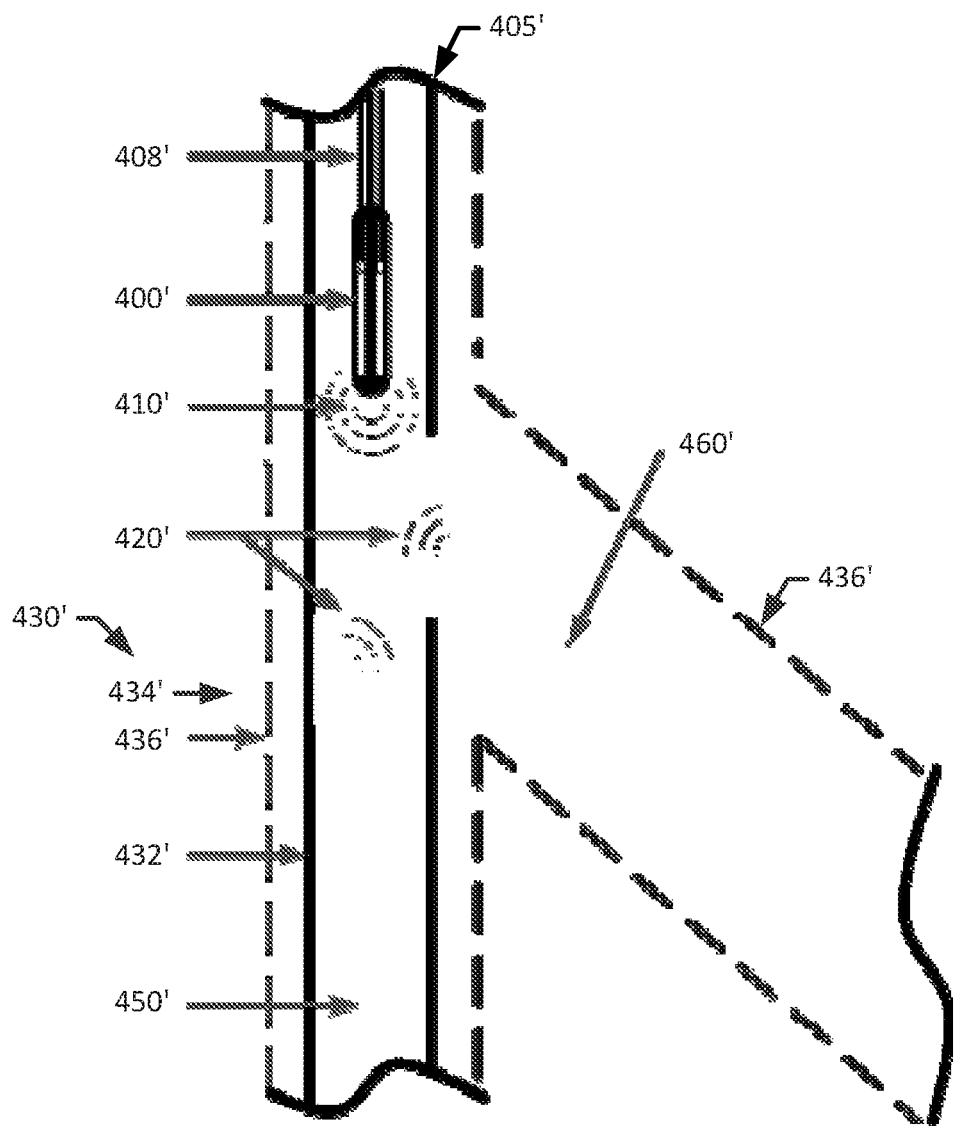
Figure 4C:
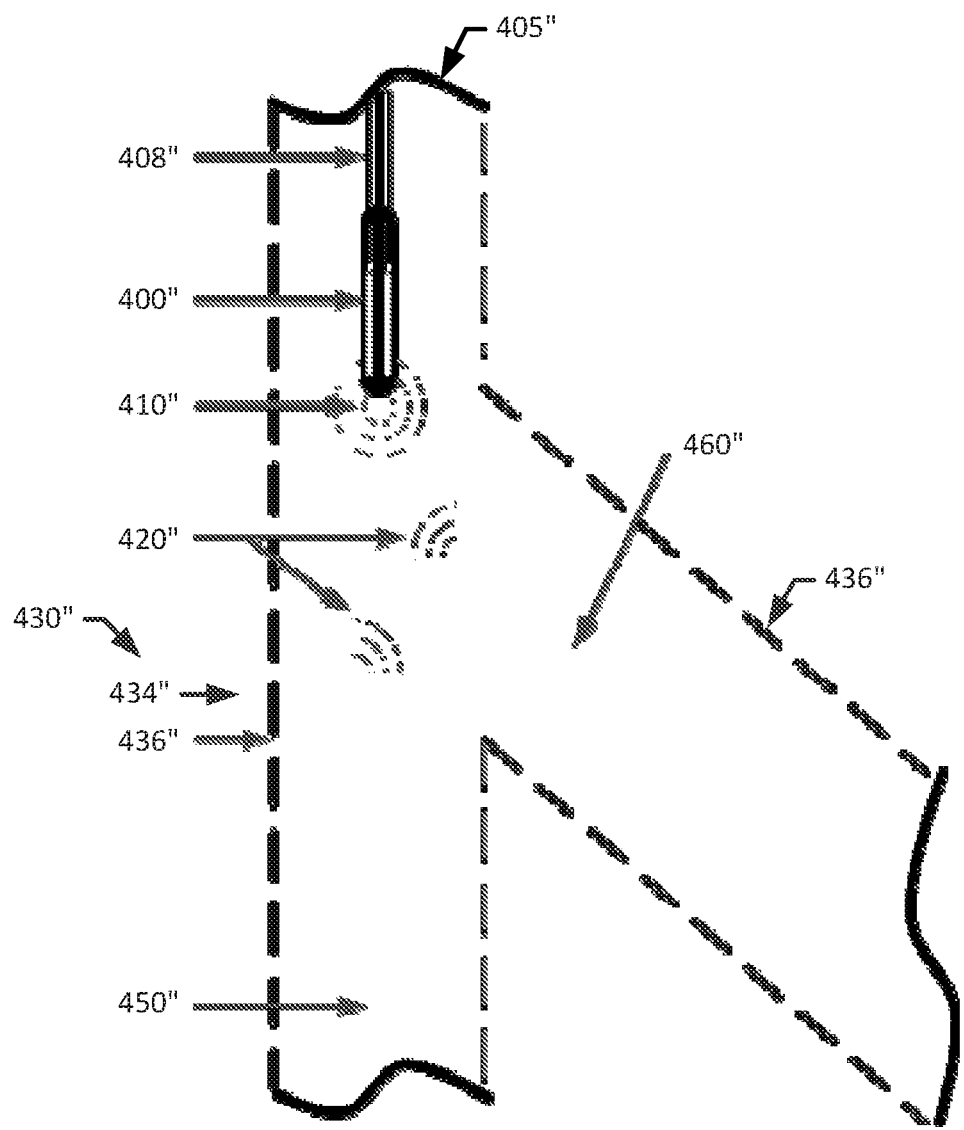

Advantageously, embodiments can distinguish between various types of multilateral wells. For example, FIGS. 4A-C show a lateral detection tool 400, 400′, 400″ in communication with a wireline 408, 408′, 408″ and deployed within a motherbore 450, 450′, 450″ adjacent a lateral 460, 460′, 460″. A radiated electromagnetic pulse 410, 410′, 410″ strikes surrounding objects in the environment 430, 430′, 430″ (e.g., including walls of casing or liner 432, 432′, and the surrounding formation 434, 434′, 434″, including the walls of the bores 436, 436′, 436″). Detected reflections of the electromagnetic pulse 420, 420′, 420″ are received by one or antennas in the lateral detection tool 400, 400′, 400″. According to embodiments, processing the received signal provides information that can be used to determine the location and orientation of the lateral 460, 460′, 460″ with respect to the motherbore 450, 450′, 450″.

Moreover, advantageously, processing the received signal can provide an accurate representation of detected laterals regardless of the type of motherbore and type of lateral. For example, embodiments accurately portray the presence and location of a cased lateral 460 adjacent a cased motherbore 450, as shown in the configuration of FIG. 4A. Moreover, embodiments accurately portray the presence and location of an open-hole lateral 460′ adjacent a cased motherbore 450′ as shown in the configuration of FIG. 4B. Still further, embodiments accurately portray the presence and location of an open-hole lateral 460″ adjacent an open-hole motherbore 450″ as shown in the configuration of FIG. 4C.

Certain features of the electromagnetic pulse 410, 410′, 410″ contribute to such functionality. For example, electromagnetic waves are often not used in the presence of water, particularly as salinity increases, due to high attenuation of the electromagnetic signal. This aspect of electromagnetic waves is employed advantageously in embodiments, however. Indeed, by using a wideband signal source and a wideband antenna, a wide range of frequencies can be achieved. The wide range of transmitted signal frequencies permits calibration of the electromagnetic pulse at a frequency determined to minimize attenuation of the transmitted and reflected signals in the downhole environment. Moreover, because the signal travel distance, or the distance between the antenna and detectable objects, can be a few inches in the downhole environment, some degree of attenuation can be beneficial. In other words, embodiments include tuning the one or more antennas such that attenuation increases at a certain threshold distance greater than the distance between the antennas and detectable objects. This prevents noise from far-off objects from interfering with the detection of detectable laterals. Put another way, some degree of attenuation offers a favorable signal to noise ratio, which enables more accurate detection of the entryway for a lateral along the motherbore wall.

In addition, a combination of transmitted power and frequency, as well as other features of the lateral detection algorithm allow for the detection of the various lateral openings discussed with reference to FIGS. 4A-C. For example, the lateral detection algorithm, in part, involves calculating the power of the signal returning to the one or more antennas 124, 124′ (FIGS. 1-2). The general radar equation can be modified when the transmitting antenna and receiving antenna are in the same location. The resulting equation in this case is given by Equation (1):

$$P_r = \frac{P_t G_t A_r \sigma F^4}{(4\pi)^2 R^4} \tag{1}$$

In this application of the radar equation, $P_r$=received power; $P_t$=transmitter power; $G_t$=gain of transmitter antenna; $A_r$=effective aperture (area) of the receiving antenna; F=pattern propagation factor; σ=radar cross section, or scattering coefficient, of the target; and R=range.

The lateral detection algorithm further considers that the lateral detection tool 400, 400′, 400′ can perform while moving towards or away from the opening of a lateral 460, 460′, 460″. In these situations, the lateral detection algorithm factors in the change in the reflected frequency, which can be quantified by the Doppler Effect. A calculation of the Doppler frequency shift can be achieved with Equation (2):

$$F_D = 2 \times F_T \times \left(\frac{V_R}{C}\right) \tag{2}$$

In Equation (2), $F_D$=doppler frequency; $F_t$=transmit frequency; $V_r$=radial velocity; and C=speed of light.

Further still, the lateral detection algorithm factors in the polarization of reflections of the electromagnetic pulse 420, 420', 420". In electromagnetic radiation, the electric field is perpendicular to the direction of propagation of a wave. The orientation of this electric field is referred to as the polarization of the wave. According to embodiments, the polarization of the wave can be controlled to achieve different effects. For example, horizontal, vertical, linear, and circular polarizations can be used to detect different types of reflections. Linear and random polarization returns are particularly relevant. Linear polarization, for example, indicates metal surfaces. Hence, the lateral detection algorithm can be used to interpret linear polarization returns as casing. In addition, random polarization indicates a fractal structure, such as rocks or soil. Hence, the lateral detection algorithm can be used to interpret random polarization returns as formation rocks. These features of the lateral detection algorithm allow for the precise detection of the location and orientation of laterals in a downhole environment and also allow for the identification of various types of laterals branching off of various types of motherbores, including for examples the various lateral and motherbore combinations discussed with reference to FIGS. 4A-C. In addition, when one or more antennas are arranged in an array, the lateral detection algorithm can analyze the differences between the characteristics of signals received by the different antennas in the array to provide a more accurate picture of the downhole environment. In certain embodiments, the traditional transit time principle of radar is not considered, or is given less weight in the lateral detection algorithm, due to the relatively short distances traveled by radiated waves 410, 410', 410" and reflected waves 420, 420', 420" in the downhole environment. Instead, comparatively more weight can be given to frequency modulation, reflected power levels, and, in the case of a moving lateral detection tool 400, 400', 400", pulse-Doppler signal processing. The presence of larger lateral opening may result in a weaker reflection of the pulse (e.g., due to the absence of the casing, the wall of the motherbore, or the formation to reflect of the pulse), and conversely, the absence of a lateral opening may result in a stronger reflection of the pulse (e.g., due to the presence of the casing, the wall of the motherbore, or the formation to reflect the pulse). Thus, in some embodiments, it may be determined that a lateral is present based on receipt of a relatively weak reflection of a pulse, and, conversely, it may be determined that a lateral is not present based on receipt of a relatively strong reflection of a pulse. Once an accurate location for a lateral 460, 460', 460" has been determined, a tool steering mechanism can be used to direct the lateral detection tool 400, 400', 400' into the detected lateral 460, 460', 460". Steering can be an automated process in which received data is fed back to a tool steering mechanism control system and the tool is steered responsive to the received data. In some embodiments, a surface operator manually steers the subsurface unit.

Figure 5A:
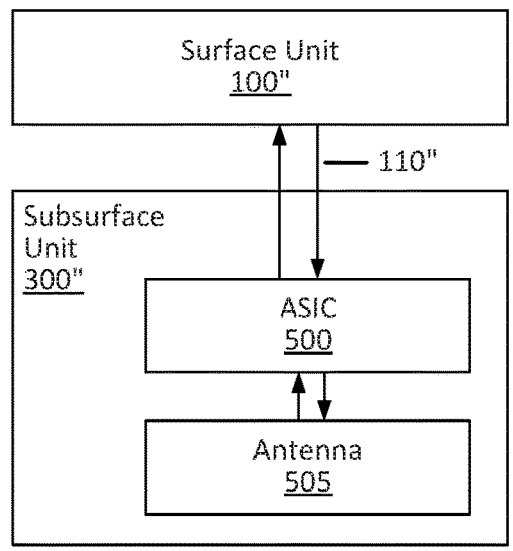
FIG. 5A is a schematic diagram of a system with an application-specific integrated circuit (ASIC) according to an embodiment.
Figure 5B:
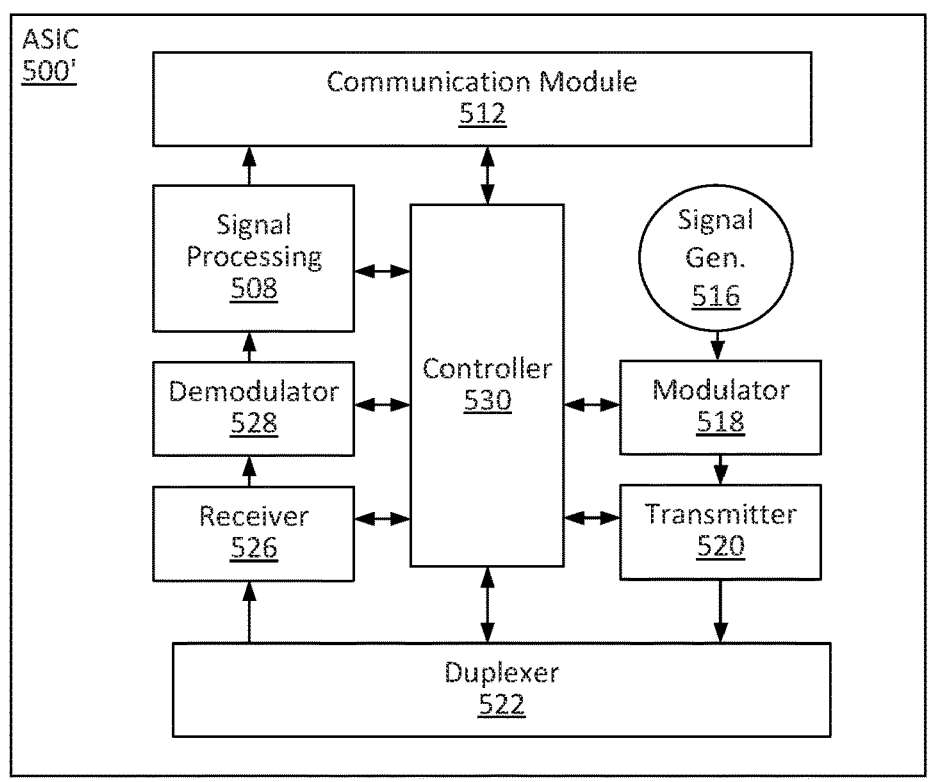
FIG. 5B is a schematic diagram of an example ASIC according to an embodiment.

FIGS. 5A-B provide an example of another configuration within the scope of the invention. For example, a surface unit 100" can be in communication with a subsurface unit 300" via a wireline 110''' or coil tubing. As with other embodiments, the subsurface unit 300" can include one or more antennas 505, for example, arranged in an array (e.g., the same or similar to that of antennas 124, 124', 124"). The one or more antennas 505 can be disposed within a downhole end of the subsurface unit 300". Other components can be disposed within a uphole end of the subsurface unit 300". According to embodiments, these other components can form portions of an application specific integrated circuit (ASIC) 500. One possible configuration of microelectronic components on an ASIC is illustrated in FIG. 5B. For example, an ASIC 500' can include a signal generator 516, which, in embodiments, can be configured to generate a wideband electromagnetic signal (e.g., the same or similar to that of signal generator 116, 116' described herein). An ASIC 500' further can include a modulator 518 (e.g., the same or similar to that of modulator 118, 118'), a transmitter 520 (e.g., the same or similar to that of transmitter 120, 120'), a duplexer 522 (e.g., the same or similar to that of duplexer 122, 122'), a receiver 526 (e.g., the same or similar to that of receiver 122, 122'), a demodulator 528 (e.g., the same or similar to that of demodulator 128, 128'), a signal processing module 508 (e.g., the same or similar to that of signal processing module 108, 108'), and a communication module 512 (e.g., the same or similar to that of communication module 112, 112'). A controller 530 (e.g., the same or similar to that of controller 114, 114') on the ASIC 500' can be used to control operations of the components on the ASIC 500'. In embodiments, these microelectronic components can be included on a chip with memory and processor components as well. Hence, the components disclosed as situated on an ASIC can be included on a system-on-a-chip in certain embodiments. According to embodiments, these microelectronic components can function similar to their analogues discussed previously. Moreover, these components can be arranged in the same manner with respect to one another, though it will be understood by one skilled in the art that other configurations can be used without departing from the scope of the invention.

Figure 6:
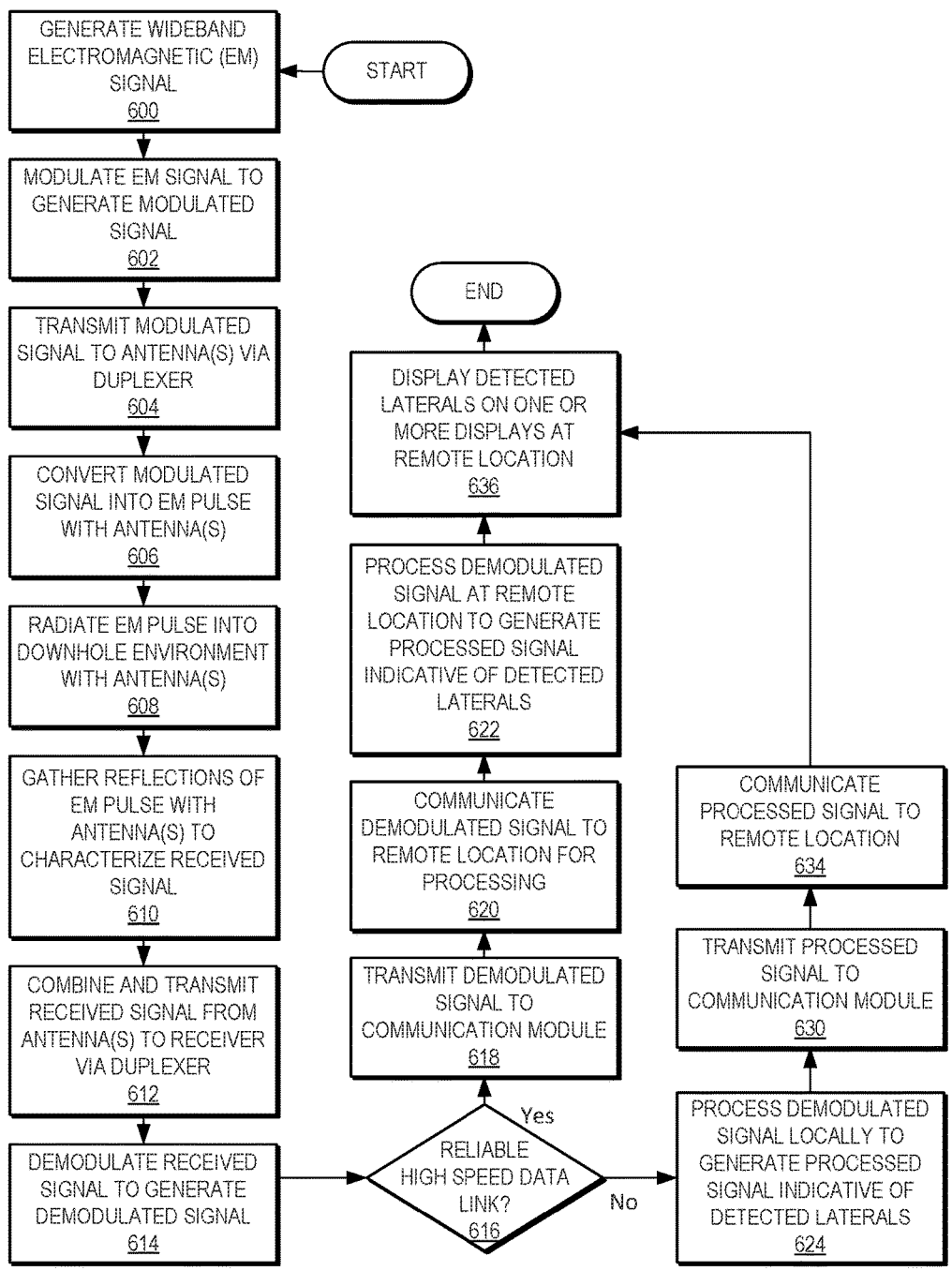
FIG. 6 is a flowchart diagram that depicts a method to detect a lateral in a well according to an embodiment.

As noted, various methods are within the scope of the invention. For example, FIG. 6 depicts steps of a method according to an embodiment. A method can include generating a wideband electromagnetic signal 600, modulating the electromagnetic signal to generate a modulated signal 602, and transmitted the modulated signal to one or more antennas via a duplexer 604. An example method of generating a wideband electromagnetic signal 600 is described herein with regard to at least method 700 of FIG. 7. According to embodiments, the method further can include converting the modulated signal into an electromagnetic pulse using the one or more antennas 606. The electromagnetic pulse can be radiated into a downhole environment with the one or more antennas 608. When the electromagnetic pulse strikes objects in the downhole environment, it can be expected that some of the waves will be scattered and some will be reflected back to the source. Accordingly, embodiments can include detecting reflections of the electromagnetic pulse with the one or more antennas and characterizing these reflections as a received signal 610. The received signal can be combined from the one or more antennas and provided to a receiver via the duplexer 612. The method further can include demodulating the received signal to generate a demodulated signal 614.

Methods within the scope of the invention can include varied steps, dependent on whether a reliable high speed data link exists between a communication module in a subsurface unit and communication equipment at a remote location, which can include, for example, a surface unit. Hence, a determination is made whether such a reliable high speed data link exists 616. If so, in embodiments, the method can include transmitting the demodulated signal to the communication module 618 and communicating the demodulated signal to the remote location for processing 620. The method further can include processing the demodulated signal at the remote location to generate a processed signal indicative of detected laterals 622. For example, processing the demodulated signal can include using a lateral detection algorithm similar that that disclosed in this application. Once the demodulated signal has been processed, the processed signal can be interpreted to display detected laterals on one or more displays at the remote location 636.

In certain embodiments, for example, if a reliable high speed data link does not exist at step 616, embodiments of the method can include processing the demodulated signal locally, at the subsurface unit, thereby to generate a processed signal indicative of detected laterals 624. It will be understood that such local processing is not strictly dependent on the absence of a reliable high speed data link, but is only illustrated as such according to some embodiments. In other embodiments, circumstances may dictate local processing even when a reliable high speed data link between a subsurface unit and surface unit exists and is fully functional. In any event, once the demodulated signal has been processed locally to generate a processed signal 624, the processed signal can be transmitted to a communication module 630, and the communication module may communicate the processed signal to the remote location 634. In embodiments, a second check can occur (e.g., after block 624 and before block 630) to determine whether a reliable high speed data link exists that can be used to transmit the processed signal to the communication module. If it is determined that a reliable high speed data link does exists, the method can include, then, transmitting the processed signal to a communication module 630 via the high speed data link, and the communication module communicating the processed signal to the remote location 634. If it is determined that a reliable high speed data link does not exists, the method can include re-checking the data link repeatedly until such a link is restored or initially established, and transmitting the processed signal to a communication module 630 via the high speed data link (once established) for communication to the remote location 634. According to embodiments, the processed signal can be stored indefinitely until such a reliable high speed data link is established. In certain cases, the subsurface unit can be recovered to download the processed signal data from the subsurface unit and manually upload the processed signal data to a surface unit. From there, the detected laterals can be displayed on one or more displays at the remote location 636.

Figure 7:
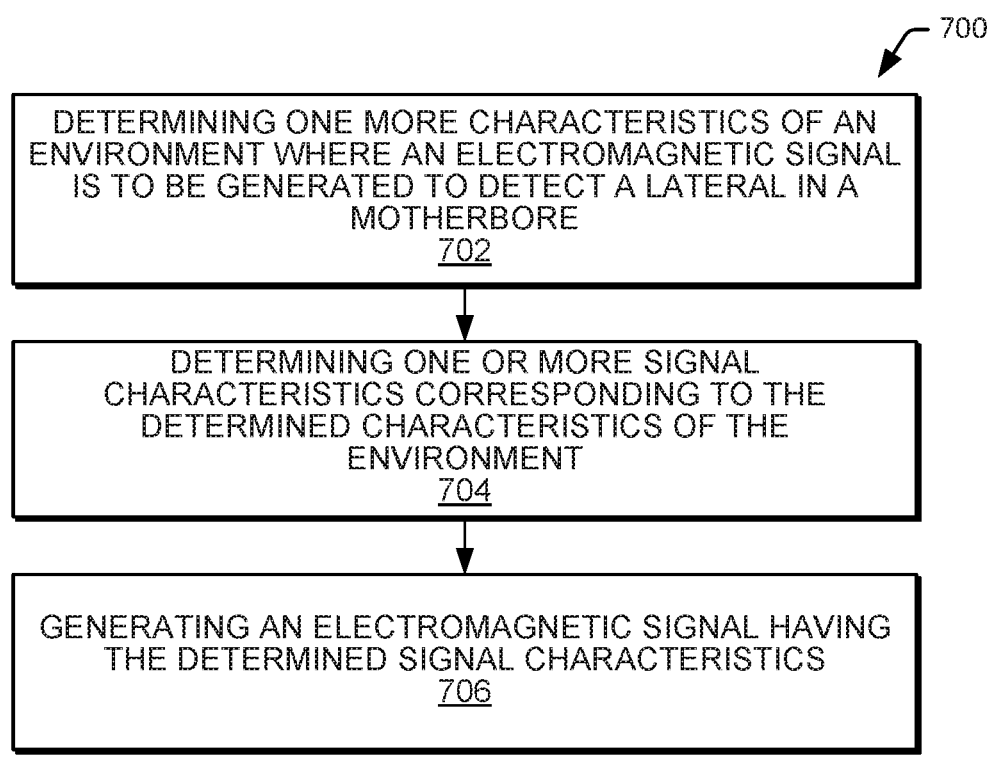
FIG. 7 is a flowchart that illustrates a method for generating a wideband electromagnetic signal according to an embodiment.

FIG. 7 is a flowchart that illustrates a method 700 for generating a wideband electromagnetic signal in accordance with an embodiment. Such a method 700 may be performed at step 600 of the method described with regard to FIG. 6. Method 700 may include determining one more characteristics of an environment where an electromagnetic signal is to be generated to detect a lateral in a motherbore (block 702), determining one or more signal characteristics corresponding to the determined characteristics of the environment (block 704), and generating an electromagnetic signal having the determined signal characteristics (block 706).

In some embodiments, determining one more characteristics of an environment where an electromagnetic signal is to be generated to detect a lateral in the motherbore (block 702) includes determining one or more characteristics of the wellbore, casing, and the formation in a location of the motherbore where an electromagnetic signal is to be generated to detect a lateral in a motherbore. This may include, for example, characteristics of an environment surrounding or expected to surround the subsurface unit 300, 300', 300" during transmission of the electromagnetic signal via the antenna 124, 124'. For example, if the subsurface unit 300, 300', 300" is located at a depth in the motherbore, then determining one more characteristics of an environment where an electromagnetic signal is to be generated to detect a lateral in the motherbore may include determining one or more characteristics of the wellbore, one or more characteristics of any casing at or near a depth in the motherbore, and one or more characteristics the formation at the depth. Relevant characteristics of the wellbore may include diameter, depth, whether casing is present in the motherbore, whether casing is present in the lateral that is to be located, a diameter of the casing, a thickness of the casing, and/or the like. Relevant characteristics of the formation may include a reflectivity, resistivity, impedance and/or the like of the portion of the formation surrounding the motherbore.

In some embodiments, determining one or more signal characteristics corresponding to the determined characteristics of the environment (block 704) includes selecting determining a signal frequency and a signal transmission power that corresponds to the determined characteristics of the environment. For example, if a first environment (e.g., in a first motherbore, or at a first depth in the first motherbore) has a first set of characteristics (e.g., a wellbore diameter of 20 cm, a casing inner diameter of 19 cm, a casing outer diameter of 20 cm, and the surrounding formation having reflectivity coefficient value of about 0.2) a first set of signal characteristics can be determined (e.g., a frequency of about 1 MHz, and a transmission power of about 1 Watt (W). If a second environment (e.g., in a second motherbore, or at a second depth in the first motherbore) has a first set of characteristics (e.g., a wellbore diameter of 15 cm, a casing inner diameter of 14 cm, a casing outer diameter of 15 cm, and a formation having a reflectivity coefficient value of about 0.4) a second set of signal characteristics can be determined (e.g., a frequency of about 100 KHz, and a transmission power of about 2 W. In some embodiments, the frequency is selected from within an operational range of the signal source. For example, if the signal generator 116, 116' and the antenna 124, 124', 124" have an operational frequency range of about 1 KHz to about 5 GHz (e.g., the operational frequency ranges of the signal generator 116, 116' and the antenna 124, 124', 124" overlap in the range of about 1 KHz to about 5 GHz), then the frequency may be selected from within that operational range. In some embodiments, the transmission power is selected from within an operational range of the signal source. For example, if the signal generator 116, 116' and the antenna 124, 124', 124" have an operational power range of about 1 KHz to about 5 GHz, then the transmission power may be selected from within that operational range.

In some embodiments, generating an electromagnetic signal having the determined signal characteristics (block 706) includes generating an electromagnetic signal using the subsurface unit 300, 300', 300" to generate an electromagnetic signal having the determined signal characteristics (e.g., the determined frequency and transmission power). This can be accomplished, for example, in a manner consistent with that described with regard to at least blocks 602 to 608 of FIG. 6. Moreover, the reflections creating as a result of the radiation of a corresponding electromagnetic pulse may be detected, processed and presented in a manner consistent with that described with regard to at least blocks 610-636 of FIG. 6.

In some embodiments, the method 700 can be performed for various locations of the subsurface unit 300, 300', 300" so that the electromagnetic signal can be customized for particular conditions. For example, a first set of wellbore characteristics may be determined for a first motherbore, and a corresponding first set of signal characteristics may be used for generation of electromagnetic signals/pulses as the subsurface unit 300, 300', 300" is advanced through the various portions of the motherbore. That is, for example, the same set of signal characteristics may be used throughout the motherbore. As a further example, a first set of signal characteristics may be determined and used for a first motherbore having a first set of characteristics, and a second set of signal characteristics may be determined and used for a second motherbore having a second set of characteristics. That is, for example, a single subsurface unit 300, 300', 300" may be customized to generate different electromagnetic signals/pulses for different motherbores. This may be enabled at least in part by use of a wideband signal source (e.g., including the wideband signal generator 116, 116' and the wideband antenna 124, 124', 124") that allow for a single subsurface unit 300, 300', 300" to generate electromagnetic signals/pulses with varying characteristics (e.g., varying frequency and transmission power). As yet another example, a first set of signal characteristics may be determined and used for a first portion of a motherbore (e.g., at a first depth) having a first set of characteristics, and a second set of signal characteristics may be determined and used for a second portion of the motherbore (e.g., at a second depth) having a second set of characteristics. That is, for example, the subsurface unit 300, 300', 300" may be customized to generate electromagnetic signals/pulses for different portions of the same motherbore. In some embodiments, updated signal characteristics may be determined periodically. For example, the signal characteristics may be determined for about every 10 meters the subsurface unit 300, 300', 300" is advanced in the motherbore. Thus, the subsurface unit 300, 300', 300" may be customized on the fly, in real-time to take into account the changing characteristics of the environment as the subsurface unit 300, 300', 300" is moved through the motherbore in search of a lateral.

In the various embodiments described in this application, a person having ordinary skill in the art will recognize that various types of memory are readable by a computer, such as the memory described in this application in reference to the various computers, e.g., computer, computer server, web server, or other computers with embodiments. Examples of computer-readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems, apparatuses, computer media, and the method steps described can operate on a computer. It will be understood by those skilled in the art that such media can be at other locations instead of, or in addition to, the locations described to store computer program products, e.g., including software thereon. It will be understood by those skilled in the art that the various software modules or electronic components described can be implemented and maintained by electronic hardware, software, or a combination of the two, and that such embodiments are contemplated by embodiments of the present invention.

In the drawings and specification, there have been disclosed embodiments of systems, apparatuses, and methods, and although specific terms are employed, the terms are used in a descriptive sense only and not for purposes of limitation. Embodiments have been described in considerable detail with specific reference to illustrated embodiments. It will be apparent, however, that various modifications and changes can be made within the spirit and scope of the embodiments of the present invention as described in the foregoing specification, and such modifications and changes are to be considered equivalents and part of this disclosure. Moreover, it is noted that various features described with respect to certain embodiments are to be imputed to other embodiments as well unless specifically stated otherwise.

That claimed is:

1. A system for detecting lateral wellbores, the system comprising:
    a subsurface unit configured to be disposed in a motherbore of a well, the subsurface unit comprising:
        a control and communication system disposed at an uphole end of the subsurface unit, the control and communication system comprising a wideband signal generator configured to generate electromagnetic signals of frequencies within a wideband frequency range; and
        a tool head disposed in a downhole end of the subsurface unit, the tool head being detachably coupled to the control and communication system, the tool head comprising a wideband antenna configured to generate electromagnetic pulses having frequencies within the wideband frequency range, the wideband antenna configured to:
            receive, an electromagnetic signal generated by the control and communication system, the electromagnetic signal being of a given frequency;
            radiate, into the environment surrounding the subsurface unit, an electromagnetic pulse corresponding to the electromagnetic signal, the electromagnetic pulse being of the given frequency; and
            detect one or more reflections resulting from the radiation of the electromagnetic pulse into the environment surrounding the subsurface unit; and
            provide one or more reflection signals corresponding to the one or more reflections; and
    a processing module configured to determine, based on the one or more reflection signals provided, whether a lateral is present in the environment surrounding the subsurface unit.

2. The system of claim 1, wherein the control and communication system is configured to detach from the tool head in response to the tool head being lodged in a wellbore of the well.

3. The system of claim 1, wherein the wideband antenna is further configured to:
    receive, a second electromagnetic signal generated by the control and communication system, the electromagnetic signal being of a second frequency;
    radiate, into a second environment surrounding the subsurface unit, a second electromagnetic pulse corresponding to the second electromagnetic signal, the second electromagnetic pulse being of the second frequency; and
    detect one or more second reflections resulting from the radiation of the second electromagnetic pulse into the second environment surrounding the subsurface unit; and
    provide one or more second reflection signals corresponding to the one or more second reflections, and
    the processing module being further configured to determine, based on the one or more second reflection signals provided, whether a lateral is present in the second environment surrounding the subsurface unit.

4. The system of claim 3, wherein the environment surrounding the subsurface unit comprises a first portion of a motherbore of a first well, and the second environment surrounding the subsurface unit comprises a second portion of the motherbore of the first well.

5. The system of claim 3, wherein the environment surrounding the subsurface unit comprises a portion of a motherbore of a first well, and the second environment surrounding the subsurface unit comprises a portion of a motherbore of a second well.

6. The system of claim 1, wherein the processing module is configured to determine that a lateral is present in the environment surrounding the subsurface unit based on the one or more reflection signals indicating that the one or more reflections resulting from the radiation of the electromagnetic pulse into the environment surrounding the subsurface unit are relatively weak, and is configured to determine that a lateral is not present in the environment surrounding the subsurface unit based on the one or more reflection signals indicating that the one or more reflections resulting from the radiation of the electromagnetic pulse into the environment surrounding the subsurface unit are relatively strong.

7. The system of claim 1, wherein the subsurface unit comprises the processing module.

8. The system of claim 1, further comprising a surface unit comprising the processing module.

\* \* \* \* \*